(12) United States Patent
Reda et al.

(10) Patent No.: US 9,194,746 B1
(45) Date of Patent: Nov. 24, 2015

(54) SYSTEM FOR MEASURING DEVIATION OF PRINTED COLOR AT A SELECTED LOCATION ON A MOVING SUBSTRATE FROM A TARGET COLOR

(71) Applicant: Videk, Inc., Fairport, NY (US)

(72) Inventors: James Richard Reda, Jericho, VT (US); Brandon Michael Sterner, Penfield, NY (US); Christine Panarites Thomas, Macedon, NY (US); Thomas Frederik Slechta, Pittsford, NY (US)

(73) Assignee: Videk, Inc., Fairport, NY (US)

( * ) Notice: Subject to any disclaimer, the term of this patent is extended or adjusted under 35 U.S.C. 154(b) by 0 days.

(21) Appl. No.: 14/475,930

(22) Filed: Sep. 3, 2014

Related U.S. Application Data

(60) Provisional application No. 61/873,626, filed on Sep. 4, 2013.

(51) Int. Cl.
| | |
|---|---|
| *G01N 21/25* | (2006.01) |
| *G01J 3/46* | (2006.01) |
| *G01J 3/50* | (2006.01) |
| *G01J 3/02* | (2006.01) |

(52) U.S. Cl.
CPC .. *G01J 3/465* (2013.01); *G01J 3/50* (2013.01); *G01J 3/02* (2013.01); *G01J 3/46* (2013.01)

(58) Field of Classification Search
CPC .................. G01J 3/02; G01J 3/46; G01J 3/50; G01J 3/51; G01J 3/513; G01J 3/524; G01N 21/25
USPC .................................................. 356/402–425
See application file for complete search history.

(56) References Cited

U.S. PATENT DOCUMENTS

| | | |
|---|---|---|
| 5,481,380 A | 1/1996 | Bestmann |
| 5,774,225 A | 6/1998 | Goldstein et al. |
| 5,793,884 A | 8/1998 | Farrell |
| 6,043,909 A | 3/2000 | Holub |
| 6,466,334 B1 | 10/2002 | Komiya et al. |
| 6,549,653 B1 | 4/2003 | Osawa et al. |
| 6,564,714 B2 | 5/2003 | Brydges et al. |
| 6,678,067 B1 | 1/2004 | Reda et al. |
| 6,750,442 B2 | 6/2004 | Bala et al. |
| 6,980,231 B1 | 12/2005 | Ohsawa |
| 7,271,910 B2 | 9/2007 | Paul et al. |

(Continued)

OTHER PUBLICATIONS

R. W. G. Hunt & M. R. Pointer, Measuring Color, 4th Edition 2011, John Wiley & Sons, Ltd., The Atrium, Southern Gate, Chichester, West Sussex, PO19 88Q United Kingdom.

*Primary Examiner* — Abdullahi Nur
(74) *Attorney, Agent, or Firm* — Thomas G. Ference

(57) ABSTRACT

A system that measures deviation of printed color at selected locations on a moving substrate from a target color. The system comprises using a printed test image of target color, a calibrated spectrophotometer to provide spectral response values of the target color on the test image, a photonic device that provides tri-stimulus values from inline printed images and a computing device. The computing device compares the tri-stimulus values to spectral response values for the test image to calculate a spectral transformation matrix at each location selected to remove variations in optical and mechanical parameters. The spectral transformation matrix is applied to future mapped sets of tri-stimulus values of printed colors captured by the photonic device from selected locations to determine in real-time the deviation of color and thereby control color quality.

26 Claims, 14 Drawing Sheets

(56) References Cited

U.S. PATENT DOCUMENTS

| | | |
|---|---|---|
| 8,044,969 B2 | 10/2011 | Osorio et al. |
| 8,254,000 B2 | 8/2012 | Roscoe et al. |
| 8,462,386 B2 | 6/2013 | Dalal et al. |
| 2002/0195541 A1* | 12/2002 | Muthu ............... H05B 33/0869 250/205 |
| 2005/0280881 A1 | 12/2005 | Stokes et al. |
| 2006/0170996 A1 | 8/2006 | Headley et al. |

* cited by examiner

Transformation of X, Y, Z to L*, a*, b*

$$L = 116 f_y - 16$$
$$a = 500(f_x - f_y)$$
$$b = 200(f_y - f_z)$$

---

$$f_x = \sqrt[3]{x_r} \quad \text{IF} \quad x_r > 0.008856$$

ELSE $$f_x = \frac{(903.3 \, x_r) + 16}{116}$$

---

$$f_y = \sqrt[3]{y_r} \quad \text{IF} \quad y_r > 0.008856$$

ELSE $$f_y = \frac{(903.3 \, y_r) + 16}{116}$$

---

$$f_z = \sqrt[3]{z_r} \quad \text{IF} \quad z_r > 0.008856$$

ELSE $$f_z = \frac{(903.3 \, z_r) + 16}{116}$$

---

$X_r, Y_r, Z_r$ Are white ref points typical for D65

$$X_r = 95.047$$
$$Y_r = 100.0$$
$$Z_r = 108.883$$

$$x_r = \frac{X}{X_r} \qquad y_r = \frac{Y}{Y_r} \qquad z_r = \frac{Z}{Z_r}$$

Figure 9

Transformation of R, B, G to R', B', G'
(Gamma Correction)

$$V_C \propto V_S^{(1/y)}$$

$V_C$ - Corrected result for one of Red, Green, or Blue $V_S$ - Measured Value for one of Red, Green, or Blue $y$ - Correction Factor Typically In the range 1.5 to 2.5

Figure 10

Transformation of R', B', G' to X, Y, Z $$\begin{bmatrix} X \\ Y \\ Z \end{bmatrix} = \begin{bmatrix} M \end{bmatrix} \begin{bmatrix} R \\ G \\ B \end{bmatrix}$$

$[M]$ Coefficients are related to light source and sensor response

Typical Values for $[M]$ $$\begin{bmatrix} 0.393 & 0.365 & 0.192 \\ 0.212 & 0.701 & 0.866 \\ 0.189 & 0.112 & 0.958 \end{bmatrix}$$

Figure 11

SYSTEM FOR MEASURING DEVIATION OF PRINTED COLOR AT A SELECTED LOCATION ON A MOVING SUBSTRATE FROM A TARGET COLOR

RELATED APPLICATIONS

This application claims the benefit of priority of U.S. Provisional Patent Application No. 61/873,626, filed Sep. 4, 2013, having the same title as the present application and the disclosure of which is incorporated herein by reference.

FIELD

This patent application generally relates to a system for measuring deviation of color at a selected location on a moving substrate from a target color. The system includes a spectrophotometer, photonic device and a computing device. The system removes variations in optical and mechanical parameters between different selected locations on the substrate to determine in real-time the deviation of color at any location on the substrate and thereby control color quality.

BACKGROUND

Digital color printing has gained popularity for producing personalized works, containing individual information as well as color content for brand identity, promotional and other informational material where color tends to add clarity. Digital color printing is quickly replacing processes where pre-printed forms were used to supply non-variable color content followed by a secondary process that printed the variable content. There are numerous reasons for this trend including better overall economic value and a more effective end product.

As a result of this trend, the need for monitoring and identifying shifts or errors in the printed colors has become important. This is especially true where the colors printed are related to brand identity. In addition, it is common for these printing operations to occur on a number of different devices and in different physical locations. This creates the need to assure consistency within a print run (page to page), from print run to print run, from printer to printer and from location to location.

To address this need a system is required that can be incorporated inline with the printing process to scan, acquire and analyze the color content in the image. Such a system must be able to image web widths up to and possibly beyond 40-inches, and at speeds of 1000-feet per minute and beyond. Such a system must also deal with the wide gamut of color that can be produced with these types of printers.

The above stated speeds and web widths pose significant technical challenges to making inline, real-time, accurate and repeatable color measurements. For example, conventional spectrophotometers are limited to small viewing areas (typically 5 to 10 mm wide) and require the sample area to be stationary while the measurements are being made. It would require a large number of spectrophotometers to inspect the entire web width and this alone would still not address how to measure in real time. Such an approach would be physically and economically impractical.

Alternatively, using color electronic cameras to obtain an image and analyzing that image to measure the color content across the complete web introduces a new set of issues that need to be overcome. These issues include the following. 1) The impracticality of equally illuminating a wide web with the same concentration of each wavelength of light. 2) The inability to image a wide area without introducing significant optical chromatic aberrations. 3) The inability to image a wide area without introducing significant geometric distortions. 4) The inability to calibrate a camera based solution in a manner that provides accurate color measures over the complete printing gamut. This inability is due to the fact that the camera system is based on a three-channel wide-band filtering system versus the traditional multi-channel narrow-band technology of a typical spectrophotometer.

It is therefore apparent that a new approach to inline color monitoring is needed. The current patent application provides for a system that is relatively low-cost and removes variations in optical and mechanical parameters between different selected locations to determine in real-time the deviation of color at any location on a substrate and actively provide color quality control on any given page and amongst all printers tied to the system.

SUMMARY

One aspect of the present patent application is directed to a system for measuring deviation of printed color at a selected location on a moving substrate from a target color. The system comprises a printed test image of the target color, a spectrophotometer, a photonic device and a computing device. The spectrophotometer generates from the test image a spectral response curve of the target color at the selected location. The spectrophotometer generates a set of test image spectral color response values from the spectral response curve at the selected location. The photonic device monitors the moving substrate. The photonic device captures reflective tri-stimulus response of the printed color on the substrate for at least the selected location. The reflective tri-stimulus response recorded as a set of tri-stimulus values. The computing device compares the set of tri-stimulus values at the selected location on the substrate to the set of test image spectral color response values to determine a spectral transformation matrix that removes variations in optical parameters for the selected location. The computing device applies the spectral transformation matrix to future captured sets of reflective tri-stimulus values to determine a deviation value of printed color from the target color at the selected location.

Another aspect of the present patent application is directed to method of measuring deviation of printed color at a selected location on a moving substrate from a target color, comprising providing a spectrophotometer, photonic device and a computing device. The method then involves printing test color at the selected location on a test image and then determining with the spectrophotometer a set of test image spectral response values of the test color at the selected location on the test image. Mapping the printed color with the photonic device over the substrate as the substrate is being printed. The mapping records reflective tri-stimulus response as a set of tri-stimulus values for at least the selected location on the substrate. The method then involves comparing with the computing device the set of tri-stimulus values to the set of spectral response values at the selected location to determine a spectral transformation matrix that removes variations in optical parameters for the selected location. The method still further involves applying the spectral transformation matrix to future mapped sets of tri-stimulus values from the selected location on the substrate to determine deviation of printed color from the target color at the selected location.

BRIEF DESCRIPTION OF DRAWINGS

The foregoing and other aspects and advantages presented in this patent application will be apparent from the following detailed description, as illustrated in the accompanying drawings, in which:

FIG. 6b is a diagram illustrating spatial areas for image data points correlating to the logo in FIG. 6a;

FIG. 9 is a diagram showing how the transformation of X, Y, Z values to L*, a*, b values occurs for data within the system of FIG. 1;

FIG. 10 is a diagram showing how the transformation of R, G, B values to R', G', B' values occurs for data within the system of FIG. 1;

FIG. 1 is a diagram showing how the transformation of R', G', B' values to X, Y, Z values occurs for data within the system of FIG. 1;

DETAILED DESCRIPTION

Figure 1:
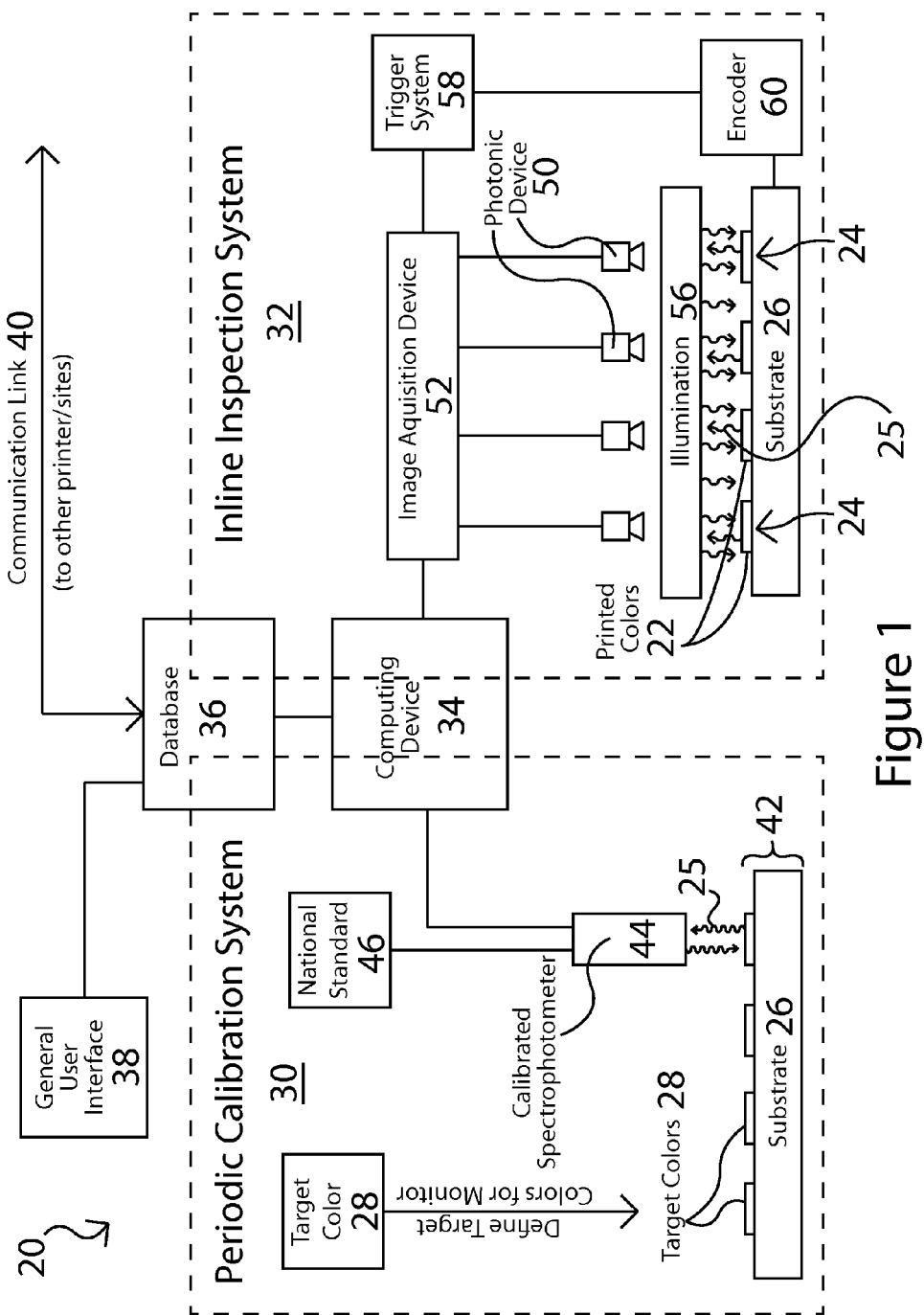
FIG. 1 is a schematic diagram showing the system for measuring deviation of color according to the present application.

System 20 for measuring deviation of color is illustrated in FIGS. 1-14. System 20 is for measuring printed colors 22 at a selected location 24 on a moving substrate 26 from a target color 28 (a.k.a. pinned color). Substrate 26 (a.k.a. web) may be paper, MYLAR®, cardboard, fabric, etc. System 20 is designed to work with continuous-web, high-speed digital color printers. System 20 comprises a periodic calibration system 30 and an inline inspection system 32. Calibration system 30 and inspection system 32 share computing device 34 and database 36. Database 36 is an organized collection of information acquired by system 20. A general user interface 38 and one or more communication links 40 to other printers and site locations may also be integrated as part of system 20. Database 36 in conjunction with computing device 34 can monitor color deviation at a plurality of sites and on a plurality of printers and substrates 26.

Figure 2:
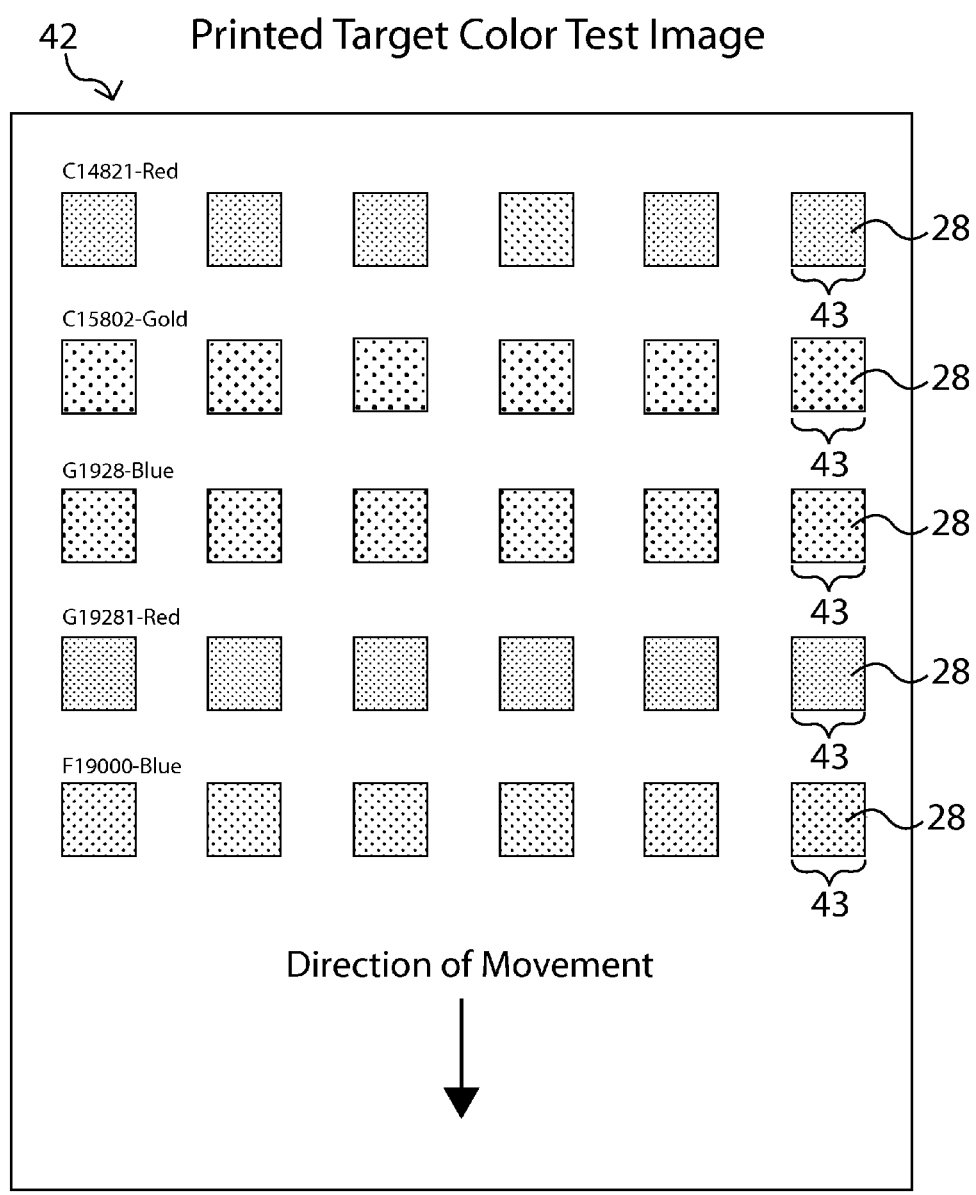
FIG. 2 is a diagram showing an exemplary printed target color test image that would be printed as part of the system shown in FIG. 1.
Figure 3:
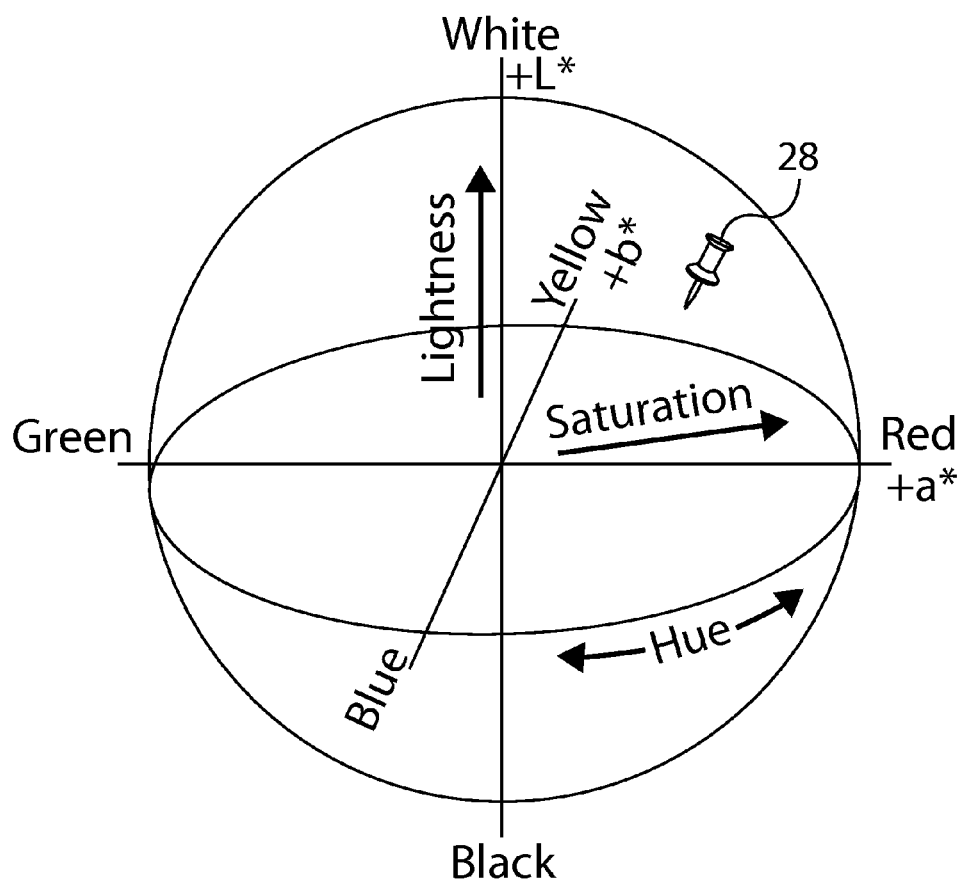
FIG. 3 is a diagram of a color sphere showing pertinent parameters of color space that are used calibrating color with the system shown in FIG. 1.

Periodic calibration system 30 includes preparing a test image 42 of defined target colors 28 that have been printed on substrate 26, FIG. 2. Multiple regions of a single target color 28, in a defined region (color block 43) are printed out spatially across the substrate 26 in a direction perpendicular to the movement of the substrate. Multiple different target colors 28 may be printed in the direction of movement of substrate 26. Periodic calibration system 30 also includes a calibrated spectrophotometer 44 for measuring the color of printed target colors 28. Spectrophotometer 44 is calibrated in a manner that is traceable to a national standard 46 such as a NIST (National Institute of Standards and Technology) standard. Spectrophotometer 44 provides measured color as spectral color response values 48 that are used to compute L*, a*, b* color space as defined by CIE (Commission Internationale de l'Eclairage). FIG. 3 illustrates a color sphere representation for visualizing L*, a*, b* color space and location of target color 28. Spectrophotometer 44 interfaces with computing device 34 to record the measured color data.

Inline inspection system 32 includes one or more photonic devices 50 spatially deployed to monitor printed color 22 across substrate 26. Photonic device 50 may be any photonic device that appropriately captures and measures color. Example photonic devices 50 include trilinear cameras, bilinear cameras, Bayer pattern type cameras and a unilinear sensor with temporally modulated color lighting. The number of photonic devices 50 depends on the desired resolution and substrate width. An image acquisition device 52 stores color image data and feeds the data to computing device 34. Illumination 56 is provided to illuminate printed colors 22 on substrate 26. Inline inspection system 32 also includes a trigger system 58 for triggering when to capture image data. An encoder 60 provides substrate positional information to system 20. Triggering system 58 activates the capture of the reflective tri-stimulus response at specific positions on substrate 26 as determined by encoder 60.

Figure 4:
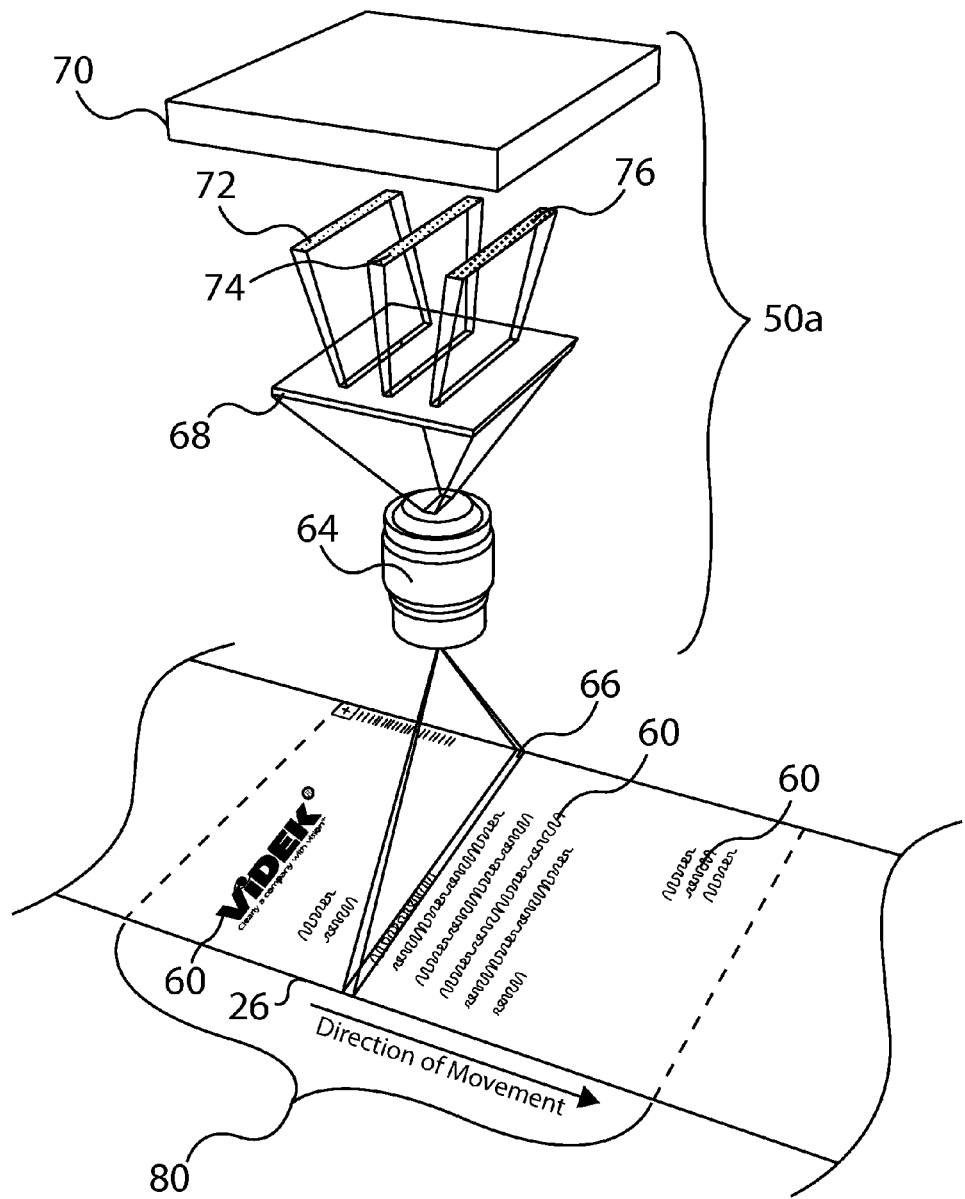
FIG. 4 is a schematic diagram of a photonic device and how the photonic device is used in system shown in FIG. 1.

Photonic device 50, such as a trilinear camera 50a, is shown in FIG. 4. Multiple photonic devices may be positioned along the width of substrate 26 to capture printed color for wide substrates. Photonic device 50 scans printed content regions 60 on moving substrate 26. Photonic device 50 captures reflective tri-stimulus response of the printed color on substrate. Reflective tri-stimulus response is recorded as a set of tri-stimulus values 85. Trilinear camera 50a includes imaging optics 64. Trilinear camera 50a captures printed color as a line of image data 66 across substrate 26. Image data 66 is directed through imaging optics 64 to a set of filters 68 where the image color is split into red (R), green (G) and blue (B) color components. Sensor 70 may be a multi-element CMOS, CCD, or pin diode elements that detects how much red light 72, green light 74 and blue light 76 reflects from the color of the image at each spatial area 78 across substrate 26. The light for each element in the sensor is converted into a proportional electrical signal and subsequently shifted serially out of the sensor as a scan line. Multiple scan lines along length of page are then combined in the image acquisition device 52 to create a complete image of the printed area 80.

Figure 5:
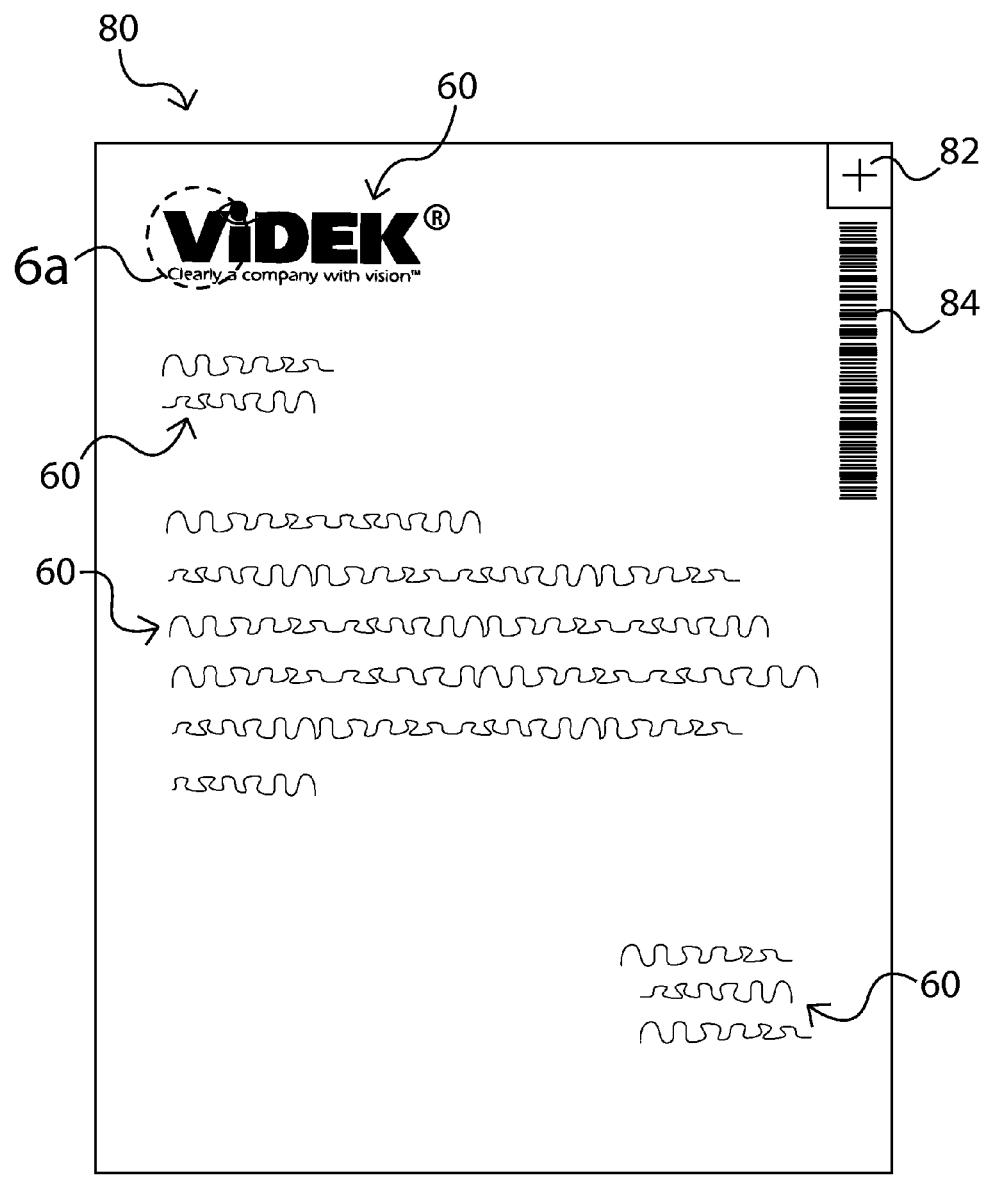
FIG. 5 is a diagram of a typical printed image on a substrate of the system in FIG. 1.

An exemplary printed area 80 (e.g., page, repeating section, document) is shown in FIG. 5. Printed area 80 includes various printed content regions 60. These regions include but are not limited to logos, text, graphics, photographs and images. Printed area 80 may include special content regions (e.g. trigger mark 82, barcode 84) that provide information to photonic device 50 or another sensor of system 20. Trigger mark 82 identifies printed area 80 delineation. Barcode 84 identifies type of content and selected locations 24 in the printed area 80. Alternatively for determining selected location 24, the intrinsic data on the printed page can be evaluated or the content of an automated data stream can be used to determine what is to be printed and determine selected locations 24 on substrate 26. U.S. Pat. No. 6,678,067 describes an automated inspection system that uses conditional logic based on information contained within the data stream that is being fed to direct the printed content of the page, the entirety of this patent which is herein incorporated by reference.

Figure 6A:
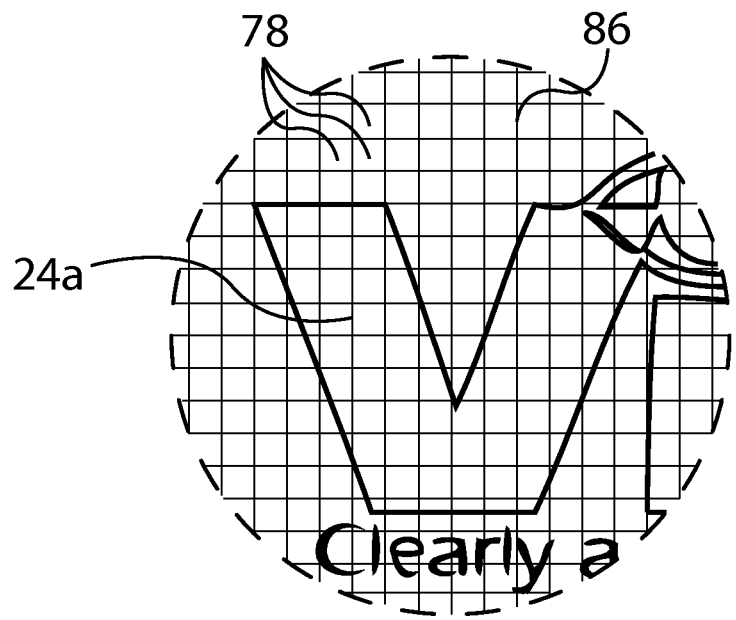
FIG. 6a is an enlarged view of the circled area 6a of FIG. 5.
Figure 6B:
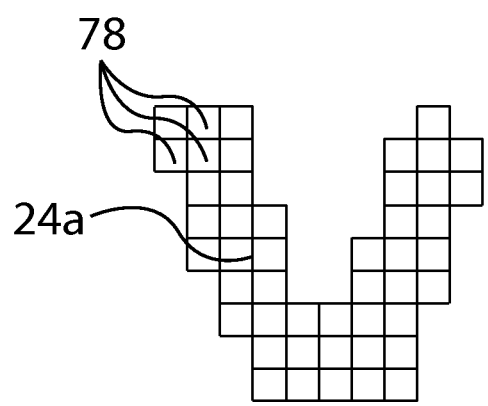

When imaging optics 64 captures printed color as a line of image data 66 across the substrate, that line of image data corresponds to a plurality of spatial areas 78 across substrate 26. Each line of image data 66 is comprised of individual color image data points that correlate to specific spatial areas across substrate 26. Each individual color image data point has a reflective tri-stimulus response that is represented by a set of tri-stimulus values 85. Spatial areas 78 typically have dimensions from 25-microns to 250-microns. A typical area for spatial area 78 would be less than 0.06-square millimeters. FIG. 6a shows a grid pattern 86 that defines spatial areas 78 covering a specific content region 60 of interest. Each scanned line by photonic device 50 across substrate 26 covers a row of spatial areas 78; and as each line is scanned along the moving length of substrate 26, an area of spatial areas covering the entire substrate is created. The specific area within the dashed circle 6a is an enlarged region of a specific selected location 24a where deviation of color is to be measured. In this example the color of the "V" of the VIDEK® logo is to be monitored. Many color measurements are made across the "V" as depicted by each spatial area 78. To determine an average color of the "V", measurements from those spatial areas 78 that reside with the "V" are extracted from all measured data as shown in FIG. 6b. The tri-stimulus values 85 are an average of a plurality of tri-stimulus values taken over the selected region and used to determine an average color.

Figure 7:
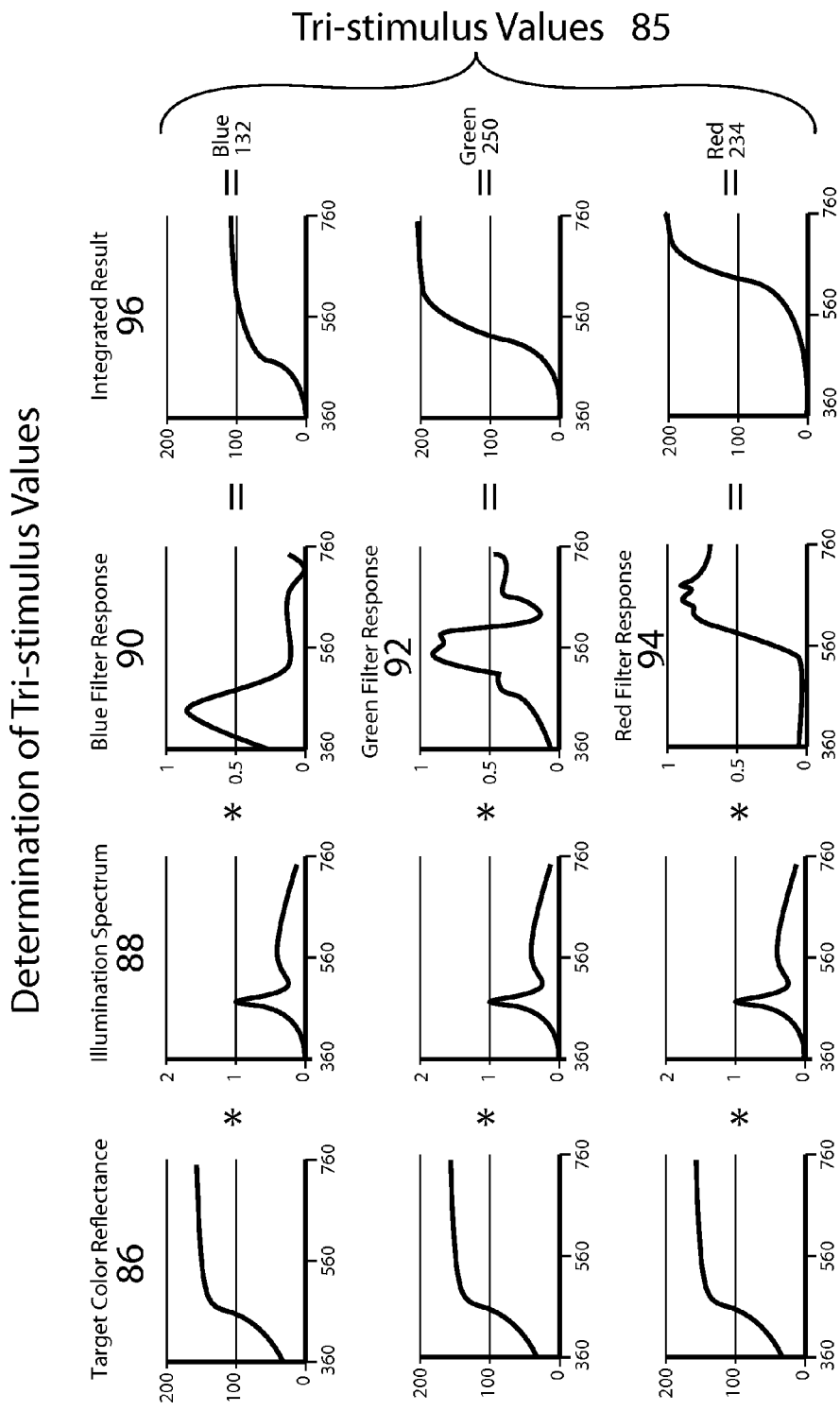
FIG. 7 is a series of graphs showing the manner in which tri-stimulus values are determined for the system shown in FIG. 1.

The process in which the tri-stimulus reflected response for any spatial area 78 is determined as shown in FIG. 7. For a given location on the substrate 26, across the entire visual spectrum, light will be absorbed, transmitted or reflected at some proportions dependent on the color as depicted in target color reflectance 86. This is further dependent on the amount of power at that wavelength in the illumination spectrum 88. The reflected light is then passed through three filters that have the properties of attenuating wavelengths outside of the desired regions of measurement as depicted by blue filter response 90, green filter response 92 and red filter response 94. The result, of measured reflection of the red, green and blue content, becomes a function of the integral product of the reflect light (as a function of the illuminator) and the color filter across the visible spectrum. Integrated result 96 shows the resulting tri-stimulus values 85 (Blue=132, Green=250, Red=234) for the target color reflectance color 86 having been illuminated by illumination spectrum 88 and passing through filters 68.

Figure 8:
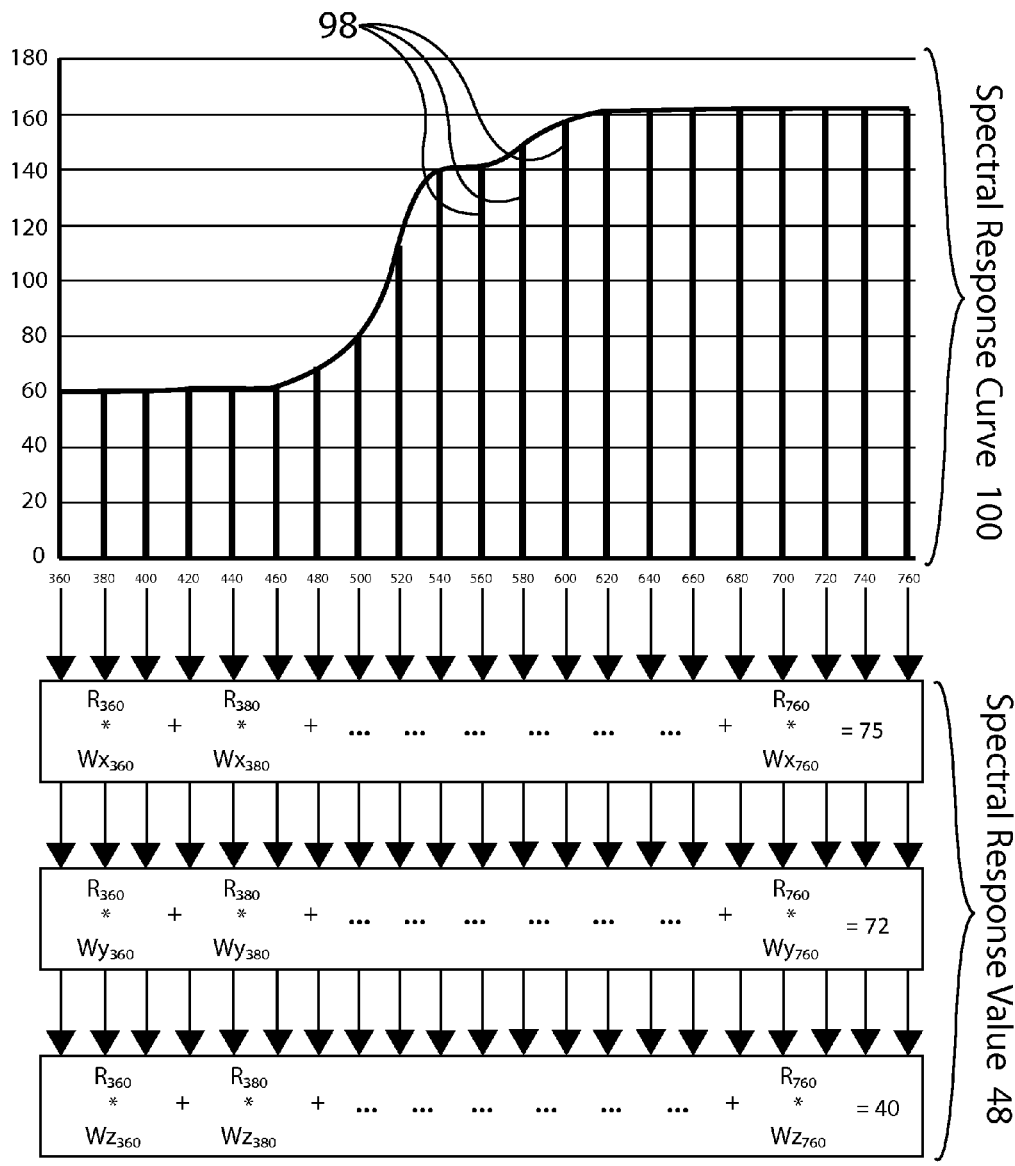
FIG. 8 is a diagram showing how X, Y, Z values are determined using data from a spectrophotometer of the system in FIG. 1.

Determination of CIE L*, a*, b* color content by spectrophotometer 44 is typically accomplished by illuminating the desired area with specific narrow wavelengths (typically 10-to-20 nm wide) of specific wavelength light 98. Spectrophotometer 44 generates spectral response curve 100. The first step in this process. FIG. 8, is to measure the power at each of these wavelengths with spectrophotometer 44, and then within the spectrophotometer, multiply that measured power by a set of given weighting factor for that wavelength. This is performed with three sets of weighting factors $(W_{X360} \ldots W_{X760}), (W_{Y360} \ldots W_{Y760}), (W_{Z360} \ldots W_{Z760})$, one for each of the color spectral response values 48 (X, Y, Z) of the CIE color space. Taking the sum of the reflected power (R) measured at each wavelength $(R_{360} \ldots R_{760})$ multiplied by the weighting factor for that wavelength results in the three scalar values, one for each of X, Y and Z. These spectral color response values 48 are then further processed by spectrophotometer 44 through a mathematical transform to convert the CIE X, Y, Z color space into CIE L*, a*, b* color spectral response values 48, FIG. 9. The second step uses a standard CIE conversion as described in "Measuring Color" (Wiley $4^{th}$ addition, Appendix 6), which is herein incorporated by reference. In this process, the spectrum of the illumination, the weighting factors, angle of illumination and the transforms for conversion from X, Y, Z to L*, a*, b* is performed to known published CIE standards.

Once a set of target colors 58 printed across the color test page 42 has been measured by spectrophotometer 44 to obtain the CIE L*, a*, b* color response values 48 and also measured inline by photonic device 50 giving tri-stimulus values 85, the tri-stimulus values need to be converted into un-calibrated L, a, b color space in order to generate a spectral transformation matrix that can be used to remove variations in optical and mechanical parameters from future tri-stimulus measurements take at that selected location 24. Tri-stimulus values are averaged over spatial areas 78 for a selected location 24 and converted into un-calibrated L, a, b values. The measurements from spectrophotometer 44 and photonic device 50 differ due to differences in the methods used to obtain and process reflected light 25. Additionally, the un-calibrated L, a, b values from photonic device 50 will differ depending on their position across substrate 26 (i.e., the direction orthogonal to the substrate movement direction) for a given target color 28. This difference is due to a number of contributing optical and mechanical parameters. These optical and mechanical parameters may include, but are not limited to non-uniformity of illumination 56, geometric and chromatic aberrations inherent to the optical system, and mechanical misalignment of substrate and light-source. In order to compensate for these differences a family of calibration factors are derived via linear equations using the known CIE L*, a*, b* and un-calibrated L, a, b values as input. Computational device 34 assists in the computation of these calibration factors by comparing the know L*, a*, b* values to the un-calibrated L, a, b values. The result of these operations is a set of gain and offset corrections for each target color 28 and for each position across substrate 26. These gain and offset corrections are accumulated for each target color and each position and together are incorporated into a spectral transformation matrix, which is then uploaded to database 36 for each specific photonic device 50 that provided the input. By having a plurality of target colors at different selected locations the overall color accuracy can be improved.

The method of measuring deviation values, CIE Delta E, of printed color 22 at a selected location 24 on a moving substrate 26 from a target color 28 comprises first providing system 20. System 20 includes a spectrophotometer, photonic devices, and a computing device along with other devices as described above. The measuring process comprises both a color calibration process 102 and a color inspection process 104. The overall process involves printing a test color at a selected location 24 on a test image 42. Spectrophotometer 44 is then used to determine a set of test image spectral response values 48 of test color at the selected location on the test image 42. The printed color 22 is then mapped with photonic device 50 over substrate 26 as the substrate is being printed. Mapping records reflective tri-stimulus response as a set of tri-stimulus values 85. Computing device 34 compares the set of tri-stimulus values 85 to the set of spectral response values 48 at selected location 24 to determine a spectral transformation matrix that removes variation in optical and mechanical parameters for the selected location. The spectral transformation matrix is then applied to future mapped sets of tri-stimulus values from selected location 24 on substrate 26 to determine deviation of printed color from the target color at the selected location. When the test color deviates from the target color an offset is included in the test image spectral response values to fix the offset.

Figure 12:
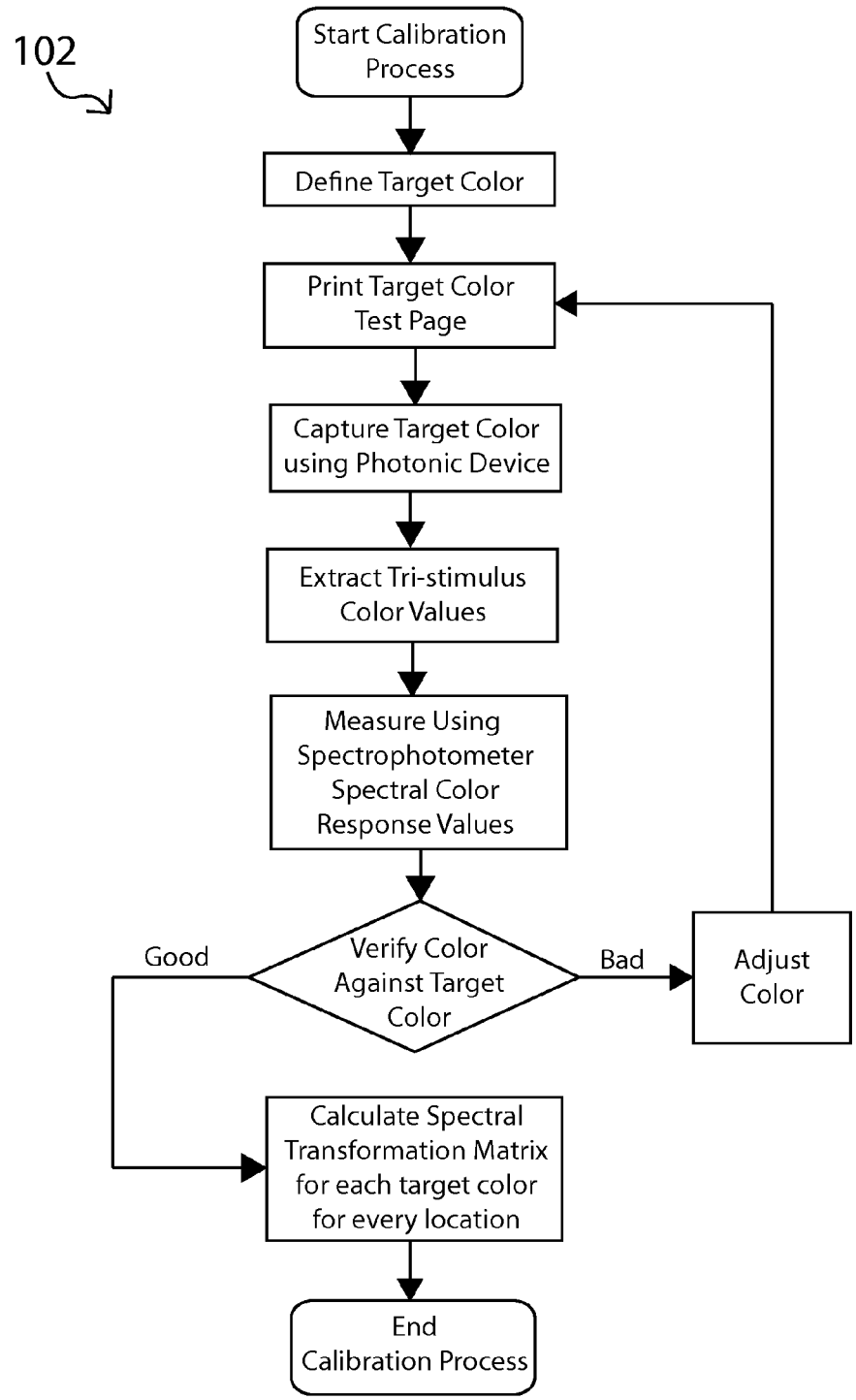
FIG. 12 is a process diagram of an exemplary calibration process for the system in FIG. 1.

In more detail, color calibration process 102 is diagramed by the flow chart in FIG. 12. To start the process, at least one target color 28 is defined. For each target color 28, CIE L*, a*, b* color response values must be provided defined as the expected CIE L*, a* b* values. These can be known values or these values can be obtained by measuring color swatches with a calibrated spectrophotometer 44. A target color test image 42 is then printed at selected locations 24 on a test image 42 as depicted in FIG. 2. Each target color 28 is printed as a series of pinned color blocks 43 (PCB) across substrate 26 perpendicular to the movement of the substrate, i.e., $PCB_{c1x1}$ to $PCB_{cnxn}$, times for each color (c) and each position (x). Next target color 28 is captured from test image 42 using photonic device 50. Photonic device 50 scans and acquires test images for color blocks $PCB_{c1x1}$ to $PCB_{cnxn}$ and stores the image data into memory of database 36. Computing device 34 calculates the un-calibrated L, a, b values from the tri-stimulus values 85 performing the following computations: 1) Obtain the average R, G, B values within the color block 43. 2) Apply a gamma correction function, as shown in FIG. 10, to compensate for sensor nonlinearity to obtain R', G', B' from the R, G and B stored values. This step corrects for non-linearity in the photonic device and the value of the compensation factor y is determined empirically for the particular photonic device. 3) Convert the R', G' and B' values to X, Y, Z color space as shown in FIG. 11. Typical values for [M] are used in the exemplary calculation; however, one would use exact values that are empirically derived. 4) Convert the X, Y, and Z values to un-calibrated L, a, b color space as shown in FIG. 9. For each color block 43 on test image 42, a calibrated, traceable spectrophotometer 44 is used to measure color response values 48 in L*, a*, b* CIE color space and record these values in memory in database 36. Compare the CIE L*, a*, b* color measurement made with the spectrophotometer to the expected CIE L*, a*, b* values. If the difference between these two sets of values is outside of the predetermined tolerance limits, correction to the printing process is required by adjusting the color and calibration cannot be completed. For each set of un-calibrated L, a, b values, calculate the calibration correction factors (CCF), in terms of gains and offsets necessary to map the un-calibrated L, a, b space to the measured CIE L*, a*, b*. Record the CCF into spectral transformation matrix for each target color 28 and at each color block 43 location. The spectral transformation matrix includes scalar CCF error corrections values for each target color 28 that represent the linear correction to be applied to the inline system measurement, on a position by position basis, to correct the composite mechanical and optical composite errors introduced for each color block 43. Finally store these CCF in a spectral transform matrix and record that matrix in database 36 of system 20 for application to future color measurements.

Figure 13:
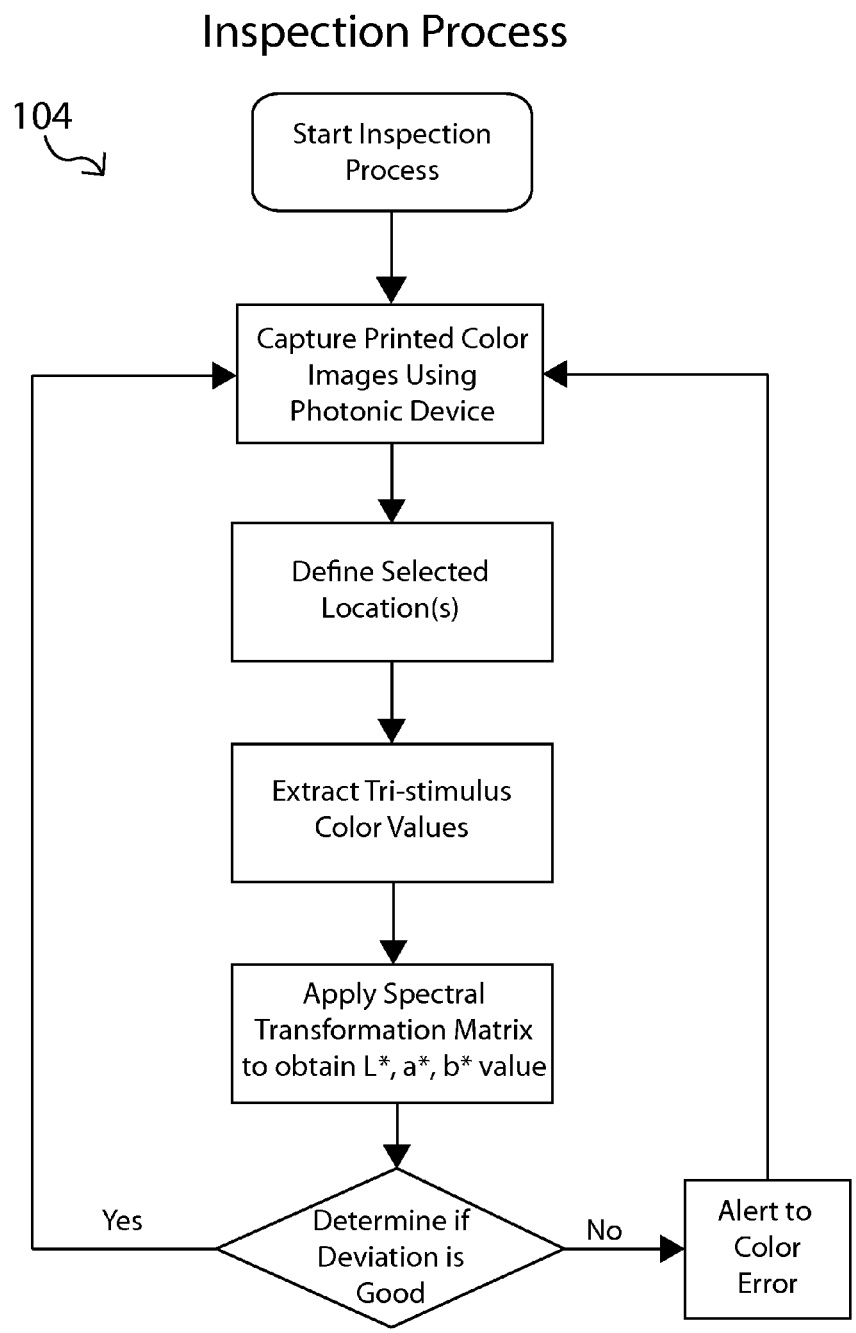
FIG. 13 is a process diagram of an exemplary inspection process for the system in FIG. 1.

Color inspection process 104 is diagramed by the flow chart in FIG. 13. Computing device 34 applies the previously generated spectral transformation matrix to future captured sets of reflective tri-stimulus values to determine a deviation of printed color from the target color at a selected location. To start the process capture printed color images using photonic device 50. Do this by scanning the full printed area 80. Record the scanned image as a full color RGB image into memory. Use either barcode 84 in the printed area 80 or intrinsic information on the scanned printed page or information within the data stream used for printing the page to identify and define the location of one or more selected locations 24. Using computing device 34, for each specific selected location 24a: 1) Obtain the average R, G, and B values within the region. 2) Apply a gamma correction function, FIG. 10, to compensate for sensor nonlinearity to obtain R', G' and B' from the R, G. and B stored values. This step corrects for non-linearity in the photonic device and the value of the compensation factor y is determined empirically for the particular photonic device. 3) Convert the R', G', B' values to X, Y, Z color space as shown in FIG. 11. 4) Convert the X, Y and Z values to L, a, b color space as shown in FIG. 9. Conversion of the R', G', B' color space to L, a, b is performed to obtain a measure of the light components that more closely models the human eye. This requires a two-step process, first converting R'G'B' to XYZ color space as defined by standardized transform settled on by the CIE special commission using a transform matrix M whose coefficients are chosen to provide compensation of the spectral power of the specific light source as well as the spectral response of the photonic device. The second step is the conversion of XYZ color space to L*, a*, b* using a standard CIE conversion as described in "Measuring Color" (Wiley $4^{th}$ addition, Appendix 6). 5) Using knowledge of the position of selected location 24, apply the CCF correction to the un-calibrated L, a, b that was calculated and stored in spectral transformation matrix during the calibration process to obtain calibrated CIE L*, a*, b* values. Using the L*, a* b* measured values just described and knowledge of the expected L*, a*, b* for this target color, calculate the three dimensional Euclidean distance (commonly known as DeltaE) between these points and compare this result to a predetermined threshold. If this result is above the desired threshold, apply a pre-determined action e.g. alerting an operator, marking the substrate, stopping the printing, etc.

Figure 14:
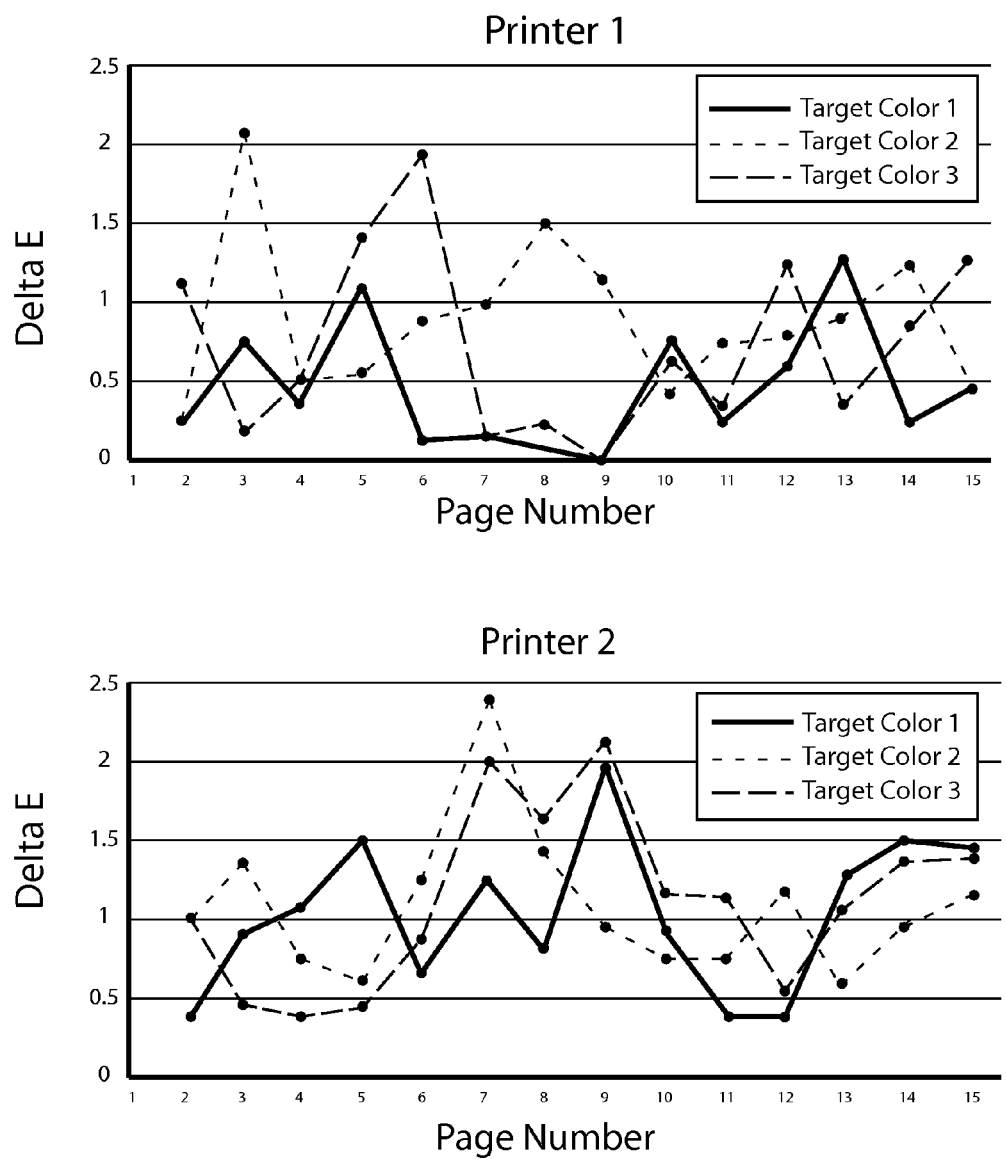
FIG. 14 is a diagram showing exemplary periodic color trend reports that may be generated by the system shown in FIG. 1.

FIG. 14 shows one example of how system 20 can be deployed to monitor color on two printers in separate locations. As each page (print area 80) is printed measurements are taken by inline by a photonic device 50 at each printer. Stored spectral transformation matrices for each color and each selected location 24 on each printer are applied to real-time measured tri-stimulus values 85 to determine DeltaE values. Three target colors are being monitored on each page. Deviation values for those target colors are track as shown in the graphs. If deviation values fall outside of a predetermined range, then the operator is alerted for corrective action. In this manner one can assure color consistency for critical colors and regions on any document within a print run (page to page), from print run to print run, from printer to printer and from location to location.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A system for measuring deviation of printed color at a selected location on a moving substrate from a target color, comprising:

a) a printed test image of the target color;
   b) a spectrophotometer that generates from the test image a spectral response curve of the target color at the selected location, wherein said spectrophotometer generates a set of test image spectral color response values from said spectral response curve at the selected location;
   c) a photonic device monitoring the moving substrate, said photonic device captures reflective tri-stimulus response of the printed color on the substrate for at least the selected location, said reflective tri-stimulus response recorded as a set of tri-stimulus values;
   d) a computing device; and
   e) wherein said computing device compares said set of tri-stimulus values at the selected location on the substrate to said set of test image spectral color response values to determine a spectral transformation matrix that removes variations in optical parameters for the selected location; wherein said computing device applies said spectral transformation matrix to future captured sets of reflective tri-stimulus values to determine a deviation value of printed color from the target color at said selected location.

2. A system as recited in claim 1, wherein said photonic device captures printed color as a line of image data across the substrate, each line of image data comprised of individual color image data points correlated to specific spatial areas across the substrate, each individual color image data point having said reflective tri-stimulus response represented as said set of tri-stimulus values.

3. A system as recited in claim 2, wherein said photonic device captures printed color on the moving substrate as multiple said lines of image data along the entire length of the substrate.

4. A system as recited in claim 2, wherein multiple photonic devices are positioned along the width of the substrate to capture printed color for wide substrates.

5. A system as recited in claim 2, wherein each said color image data point corresponds to a spatial area on the substrate of less than 0.06-square millimeters.

6. A system as recited in claim 1, wherein said test image is a plurality of at least one target color replicated at different locations across the substrate.

7. A system as recited in claim 1, wherein said set of tri-stimulus values is an average of a plurality of tri-stimulus values taken over a selected region.

8. A system as recited in claim 1, wherein said spectrophotometer is calibrated to a national standard.

9. A system as recited in claim 1, further comprising an illumination source for illuminating the substrate.

10. A system as recited in claim 1, wherein said photonic device is at least one from the group consisting of a trilinear camera, a bilinear camera, a Bayer pattern type camera and a unilinear sensor with temporally modulated color lighting.

11. A system as recited in claim 1, further comprising a triggering system and an encoder, wherein said triggering system activates the capture of said reflective tri-stimulus response at specific positions on the substrate as determined by said encoder.

12. A system as recited in claim 1, further comprising a barcode on the substrate to define the selected location on the substrate for measuring and determining said deviation value of printed color.

13. A system as recited in claim 1, further comprising an automated data stream of what is to be printed, wherein automated data stream data defines the selected location on the substrate for measuring and determining said deviation value of printed color.

14. A system as recited in claim 1, further comprising a database for storing said deviation values.

15. A system as recited in claim 14, further comprising a communication link between said database and a plurality of systems for measuring deviation of color, wherein said database in conjunction with said computing device monitors color deviation of a plurality of said substrates.

16. A system as recited in claim 1, further comprising a general user interface.

17. A system as recited in claim 1, further comprising a plurality of target colors at different selected locations to improve overall color accuracy.

18. A method of measuring deviation of printed color at a selected location on a moving substrate from a target color, comprising:
    a) providing a spectrophotometer, photonic device and a computing device;
    b) printing test color at the selected location on a test image;
    c) determining with said spectrophotometer a set of test image spectral response values of said test color at the selected location on said test image;
    d) mapping the printed color with said photonic device over the substrate as the substrate is being printed, wherein said mapping records reflective tri-stimulus response as a set of tri-stimulus values for at least the selected location on the substrate;
    e) comparing with said computing device said set of tri-stimulus values to said set of spectral response values at the selected location to determine a spectral transformation matrix that removes variation in optical parameters for the selected location; and
    f) applying said spectral transformation matrix to future mapped sets of tri-stimulus values from the selected location on the substrate to determine deviation of printed color from the target color at the selected location.

19. A method as recited in claim 18, wherein during said applying step f), said deviation value is represented at CIE Delta E.

20. A method as recited in claim 18, wherein during said mapping step d) printed color is captured as a line of image data across the substrate, each line of image data comprised of individual color image data points correlated to specific spatial areas across the substrate, each individual color image data point having said reflective tri-stimulus response represented as said set of tri-stimulus values.

21. A method as recited in claim 18, wherein during said mapping step d) said photonic device captures printed color on the moving substrate by collecting multiple said lines along the entire length of the substrate.

22. A method as recited in claim 18, wherein during said mapping step d) multiple photonic devices are positioned along the width of the substrate to capture printed color for wide substrates.

23. A method as recited in claim 18, wherein said set of tri-stimulus values is an average of a plurality of tri-stimulus values taken over a selected region.

24. A method as recited in claim 18, where in during said applying step f) conditional logic using at least one from the group including a barcode and automated data stream data is used to tell said computing device where to monitor printed color on the substrate.

25. A method as recited in claim 18, wherein said spectrophotometer is calibrated to a national standard.

26. A method as recited in claim 18, wherein during said determining step c) whereby when said test color deviates from the target color an offset is included in the test image spectral response values to fix said offset.

* * * * *